July 5, 1938.  A. P. FERGUESON  2,122,563
ORNAMENTAL FENDER SKIRT
Filed Oct. 9, 1936   2 Sheets-Sheet 1
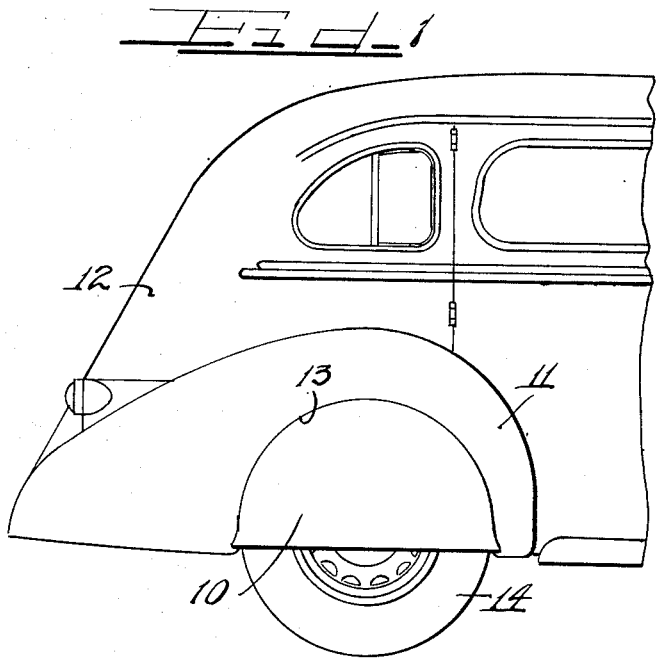
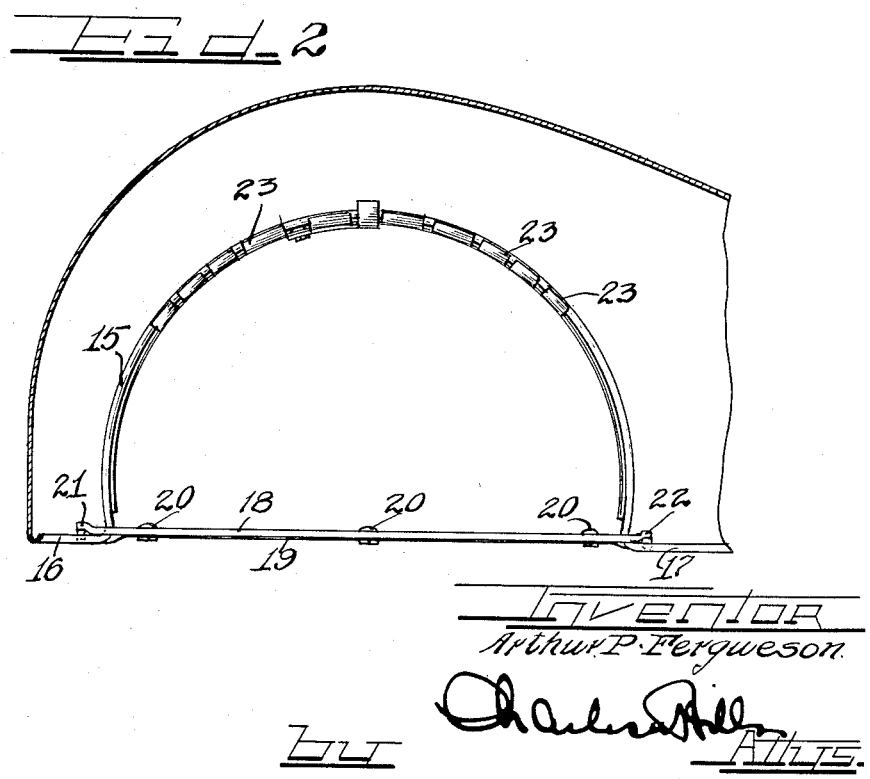
Inventor
Arthur P. Fergueson

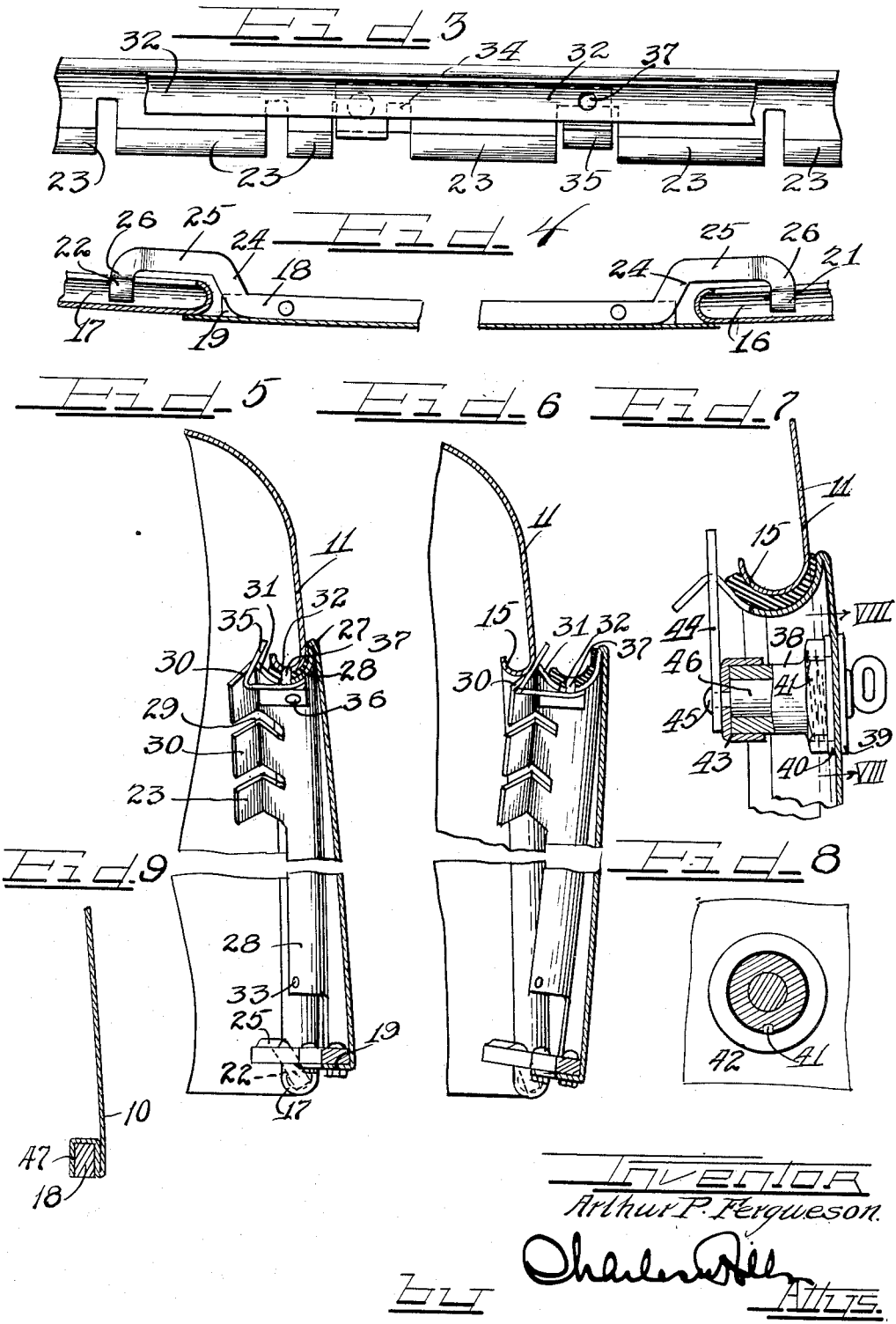

Patented July 5, 1938

2,122,563

UNITED STATES PATENT OFFICE 2,122,563

ORNAMENTAL FENDER SKIRT

Arthur P. Fergueson, Detroit, Mich., assignor, by mesne assignments, to Houdaille-Hershey Corporation, Detroit, Mich., a corporation of Michigan Application October 9, 1936, Serial No. 104,764

3 Claims. (Cl. 280—153)

This invention relates to ornamental fender skirts, and more particularly to skirts which are adapted to be held in detachable snap-on engagement with vehicle fenders.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Since this opening inherently presents an ugly outward appearance, detachable fender skirts have been employed to substantially cover this opening. As the term "fender skirt" shall hereinafter be employed, it refers to any member which is adapted to be secured to a fender for the purpose of covering that opening therein which is provided for access to and removal of a vehicle wheel.

In designing ornamental fender skirts, vehicle body engineers have sought to attain a design which would permit a quick and easy assembly of the fender skirt on a vehicle fender, which would be pleasing to the eye and enhance the general appearance of the vehicle, and which would be free from objectionable noise and vibration when the vehicle is in motion.

It is thus an object of this invention to provide a novel ornamental fender skirt which possesses the above highly desirable characteristics.

It is a further object of this invention to provide an improved fender skirt which is economical to manufacture and which is rugged and reliable in use.

It is a still further object of this invention to provide a novel ornamental fender skirt which is adapted to be held in detachable snap-on engagement with a vehicle fender.

Another object of this invention is to provide a novel ornamental fender skirt having trunnion members and resilient snap on members for detachably retaining a fender skirt in desired position on a vehicle fender.

Another and further object of this invention is to provide a novel combination of vehicle fender and ornamental fender skirt.

A further object of this invention is to provide a novel fender skirt having means thereon for positively latching the fender skirt in desired position on a vehicle fender.

A further object of this invention is to provide a novel snap-on fender skirt which is provided with means for preventing unauthorized removal of the fender skirt from the vehicle fender.

A still further object of this invention is to provide a novel ornamental fender skirt having cushioning means thereon to prevent rattling of the fender skirt on the vehicle fender when the vehicle is in motion.

It is a further object of this invention to provide a novel lock mechanism construction adapted for use with an ornamental fender skirt.

The novel features which I believe to be characteristic of my invention are set forth with particularity in the appened claims. My invention itself, however, both as to its organization and manner of construction, together with further objects and advantages thereof, may best be understood by reference to the following description, taken in connection with the accompanying drawings, in which:

Figure 1 is a side elevational view of the rear part of an automobile showing a vehicle fender and one embodiment of my novel ornamental fender skirt mounted thereon;

Figure 2 is a side elevational view, partly in cross-section, of a vehicle fender and a fender skirt, as viewed from the wheel looking out;

Figure 3 is an enlarged fragmentary view of the upper marginal edge of the ornamental fender skirt;

Figure 4 is an enlarged fragmentary view illustrating the trunnion members of the ornamental fender skirt and the manner in which they engage the vehicle fender;

Figure 5 is an enlarged sectional end view of the ornamental fender skirt in its assembled position on the vehicle fender;

Figure 6 is an enlarged sectional end view of the ornamental fender skirt as it is being snapped into position on a vehicle fender;

Figure 7 is an enlarged fragmentary view illustrating the locking mechanism of the ornamental fender skirt;

Figure 8 is a cross-sectional view of the lock structure taken along the line VIII—VIII of Figure 7; and Figure 9 is a cross-sectional view illustrating a modified way of securing a trunnion bar to an ornamental fender skirt.

In Figures 1 and 2 of the drawings, I have illustrated a fender skirt 10 constructed in accordance with the teachings of the present invention and assembled on a rear fender 11 of an automobile 12. The fender 11 is formed with the usual opening 13 which affords access to the vehicle wheel 14 and which permits ready removal of the wheel 14 in an axial direction. The ornamental fender skirt 10 is disposed over the opening 13 in such a manner as to substantially close the opening and to harmonize with the outer side wall of the fender 11. The outer surface of the skirt 10 may, of course, be substantially smooth, as is illustrated in the drawings, or it may assume any other desired configuration for purposes of ornamentation.

As shown in Figure 2, the outer marginal edge of the fender 11 which defines the opening 13 is underturned as at 15, while the outer marginal edges which define the base of the fender are underturned, as indicated at 16 and 17. As is well known by those skilled in the art, fenders of the high crown type are generally provided with these underturned edge portions to increase the rigidity of the fender. As will presently be explained, advantage is taken of this feature to assemble and secure an ornamental fender skirt in the fender opening.

In order to provide a suitable support for the fender skirt 10, a bar 18 is secured to the base 19 of the skirt in any suitable manner, such as by a plurality of bolts 20. The bar 18 is so dimensioned as to extend beyond either end of the skirt 10 to form trunnion members 21 and 22 which are adapted to be supported by the underturned edges 16 and 17, respectively, of the fender 11. A series of generally axially extending resilient fingers 23 along the curved edge portion of the skirt 10 are adapted to be cammed over the underturned edge 15 of the fender 11 into skirt retaining engagement therewith. Thus, by means of trunnion members 21 and 22 and the resilient fingers 23, the ornamental fender skirt 10 is securely and firmly mounted on the fender 11.

The particular configuration of the bar 18 which forms the trunnion members 21 and 22 may be seen best in Figure 4 of the drawings. In proximity to the junction points of the fender skirt with the fender 11, the bar 18 at either end is bent first axially inwardly as at 24, then radially outwardly as at 25, then axially outwardly as at 26, and finally downwardly into the portions which form the trunnion members 21 and 22. This particular formation of bar 18 permits the bar to freely extend around the underturned edge portion of the fender 11 at the junction point of the circular opening 13 with the base portion of the fender, as is necessary to permit the disposition of trunnion members 21 and 22 in the channel portion of the fender 11 formed by the underturned edges 16 and 17. With the bar 18 formed in this manner, the trunnion members 21 and 22 may be inserted in the underturned edge portions 16 and 17, and then the fender skirt 10 may be rocked or rotated in a plane substantially perpendicular to the plane of the skirt into the desired position on the fender 11.

In Figures 3 and 5 of the drawings, one form of resilient skirt retaining fingers or elements 23 is shown. As will be seen upon close inspection of the drawings, the resilient fingers 23 are formed by serrating a portion of the outer curved edge of the fender skirt 10. The outer portion of the skirt 10 along the entire curved edge is bent back on itself as at 27 along a line disposed inwardly of the serration to form a radially outwardly facing channel portion 28. The resilient fingers 23 are shaped to have an intermediate raised or humped portion. The resilient fingers 23 thus include a forward face 30 and a rear face 31. The forward face 30 constitutes a cam surface for guiding the resilient fingers 23 under the underturned marginal edge 15 of the fender 11, while the rear face 31 is adapted to secure the fingers against the rear surface of the underturned marginal edge portion 15.

In order to prevent rattling and other objectionable vibrations, it has been found desirable to secure a cushioning pad 32 of rubber or some other suitable material in the channel 28 to prevent a metal to metal contact between the fender skirt 10 and the underturned marginal edge 15 of the fender 11. The cushioning pad 32 may be secured to the ornamental fender skirt 10 in any desirable manner, such as by a rivet 33 at each end of the channel 28.

It has also been found desirable to provide some positive latching mechanism to prevent accidental removal of the fender skirt 10 from the fender 11. One form of latching mechanism which has been found highly satisfactory in operation is to provide a spring leaf 34 having a hooked end 35 which will engage the underturned marginal edge 15 of the fender 11 whenever the skirt 10 tends to rotate out of desired position. The spring leaf 34 is disposed beneath the channel 28 near the top of the fender skirt 10 and is firmly secured to the channel 28 at one end by some suitable means, such as a rivet 36. The free hooked end 35 of the spring 34 extends between two adjacent resilient fingers 23, as is clearly seen in Figure 3. The hooked end 35 of the spring 34 is bent slightly back on itself in order to permit this end to be cammed under the underturned marginal edge 15 of the fender 11.

Figure 6 is a view substantially similar to that of Figure 5 but shows the ornamental fender skirt 10 with the resilient fingers 23 and latching mechanism 34 out of engagement with the underturned marginal edge 15 of the fender 11. From this figure, the manner in which the resilient fingers 23 and spring 34 are cammed under the underturned marginal edge 15 of the fender 11 will readily be understood.

In order to prevent access to the latching spring 34 from the front side of the fender 11, a hole or opening 37 is provided through the cushioning means 32 and channel 28 of the skirt at such a point as will permit a screw driver or other similar instrument to be pressed down between the corner 27 of the skirt 10 and the fender 11 into engagement with the spring 34. With such an implement, the free end of the spring 34 may be depressed to a sufficient extent to permit the hooked end 35 to pass under the underturned marginal edge 15 of the fender 11.

The manner of assembling and dismounting an ornamental fender skirt of the type referred to above will now be described.

The ornamental fender skirt 10 is moved into proximity to the opening 13 of the vehicle fender 11, and the trunnion members 21 and 22 are then moved into supporting engagement with the underturned edge portions 16 and 17 of the fender 11. The ornamental fender skirt 10 is then rotated or rocked about the trunnion members 21 and 22 into engagement with the fender 11. As the circular edge portion of the skirt 10 moves into engagement with the fender 11, the resilient fingers 23 are cammed under the underturned edge 15 of the fender 11, as is also the hooked end 35 of the latching spring 34. As the hump portions 29 of the fingers 23 are forced under the underturned edge 15, the fingers snap into tight skirt-retaining engagement with the outer extremity of the underturned edge 15. It will thus be seen that the fender skirt has made a simple snap-on engagement with the fender 11, it being only necessary to place the trunnion members 21 and 22 in place and then give the upper part of the fender skirt 10 a sharp push. Any tendency for the upper part of the fender skirt 10 to move out of engagement with the fender 11 is checked by the hooked end 35 of the spring 34.

To dismount the fender skirt 10 from the fender 11, a suitable tool, such as a screw driver, is pried down between the bent portion 27 of the fender skirt 10 and the fender 11 through the opening 37 into engagement with the spring 34. By means of the tool, the spring 34 is depressed to a sufficient extent to permit the hooked end 35 to freely pass under the underturned edge 15 of the fender 11. The fender skirt 10 is then lifted to remove the trunnion members 21 and 22 from supporting engagement with the underturned edge portions 16 and 17, and the skirt is completely dismounted from the vehicle fender.

In a modified form of my invention, a locking mechanism is provided to prevent unauthorized removal of the ornamental fender skirt from the vehicle fender. One form of locking mechanism which has been found highly satisfactory in operation is illustrated in Figures 7 and 8 of the drawings. As may be seen from the drawings, the locking mechanism is mounted on the ornamental fender skirt 10 at some suitable point along the curved edge portion thereof. The lock mechanism includes a lock body 38 which is inserted through a hole in the fender skirt 10, the lock body 38 being provided, of course, with the usual outer flange or head 39. The hole in the fender skirt 10 preferably is reinforced by a washer 40 secured to the skirt 10 in any suitable manner, such as by spot welding. The lock body 38 is held in place in the usual manner by means of a nut 31. In order to prevent the lock body 38 from turning about its own axis, the washer 40 is preferably provided with a key bent in its inner diameter as at 42, which is adapted to engage a corresponding slot 42 in the lock body 38.

A cup stamping 43 is disposed over the end of the lock body 38 and a lever locking finger 44 is secured to the end by means of a screw 35. As will readily be understood by those skilled in the art, the locking finger 44 is rotatable about the axis of the locking cylinder and therefore must of necessity be securely attached to the locking cylinder which is generally designated as 46. It will also be understood that the resilient fingers 23 will be cut away at the location where the locking finger 44 engages the fender 11. From the above description, it will be apparent that the locking mechanism described takes the place of the positive latch mechanism described in the preferred embodiment of the invention. Thus, the fender skirt 10 can only be removed by a person capable of operating the locking mechanism to move the locking finger 44 out of its position as shown in Figure 7 of the drawings to permit the finger 44 to pass under the underturned marginal edge 15 of the fender 11.

The provision of the cup 43 over the outer end of the lock body 38 substantially prevents mud and water from getting into the lock cylinder. Thus, the cup 43 is an important feature of the locking mechanism, since the underside of a vehicle fender is subjected to extreme operating conditions.

In Figure 9 of the drawings I have illustrated a slight modification of my invention whereby the bar 18 which extends to form trunnion members 21 and 22 is secured to the fender skirt 10 in a manner to assure greater rigidity, as will readily be understood after a cursory inspection of Figure 9, the lower edge portion 47 of the fender skirt 10 is bent up and around the trunnion bar 18, the bar 18 being thus nested below the marginal edge portion 47 of fender skirt 10 instead of above as in the preceding figures. This particular construction has been found highly desirable in certain applications where greater rigidity of construction is required.

From the above description, it will be apparent that I have provided an extraordinarily simple arrangement for mounting ornamental fender skirts on vehicle fenders which is economical to manufacture, which is rugged and reliable in use, and which may be readily assembled or disassembled on a vehicle fender by an unskilled person. By providing a fender skirt which may be assembled on a vehicle fender by a simple shove of the person assembling the skirt on the fender, it will be readily appreciated that I have provided an extremely desirable commercial article.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. As an article of manufacture, an ornamental fender skirt having a lower edge portion bent to form a downwardly opening channel, and a fender skirt supporting bar nested and secured in said channel.

2. As an article of manufacture, an ornamental fender skirt having a lower edge portion bent to form a downwardly opening channel, and a bar nested and secured in said channel, said bar being dimensioned and shaped to extend beyond the ends of said fender skirt and form trunnion members for supporting said skirt on a vehicle fender.

3. In a fender and fender skirt assembly, supporting means for said skirt comprising a lower edge portion of said skirt sharply bent back on itself then rearwardly and finally downwardly, thereby forming a downwardly opening recess, and means including a supporting bar secured within said recess, a portion of said bar extending out from said recess into engagement with said fender.

ARTHUR P. FERGUESON.